United States Patent Office 2,952,016
Patented Sept. 6, 1960

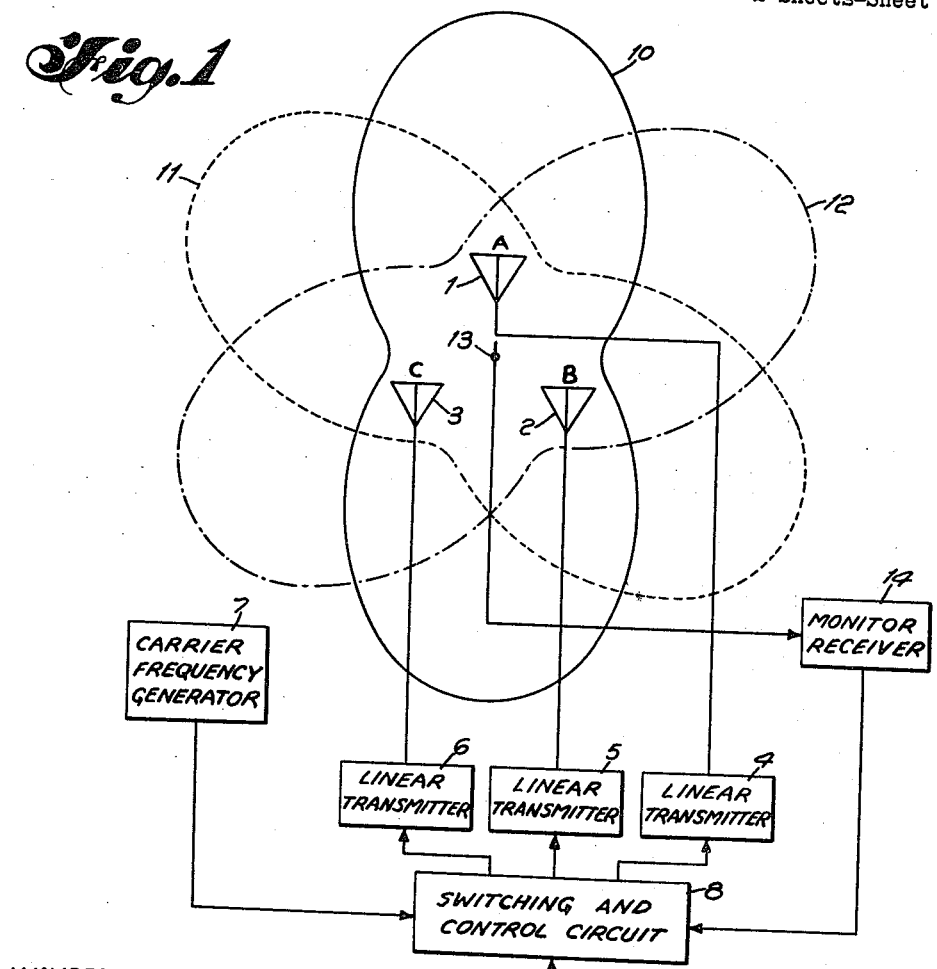
Sept. 6, 1960     J. S. LE GRAND ET AL     2,952,016
SAMPLING AND CORRECTING SYSTEM
Filed July 12, 1957     2 Sheets-Sheet 1
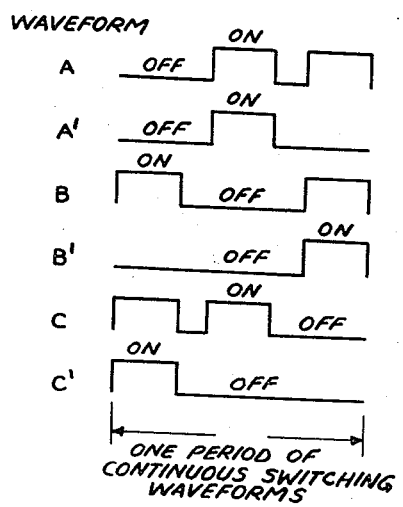
Inventors
JESSE S. LE GRAND
RICHARD H. MYERS
By *Percy P. Lantry*
Attorney

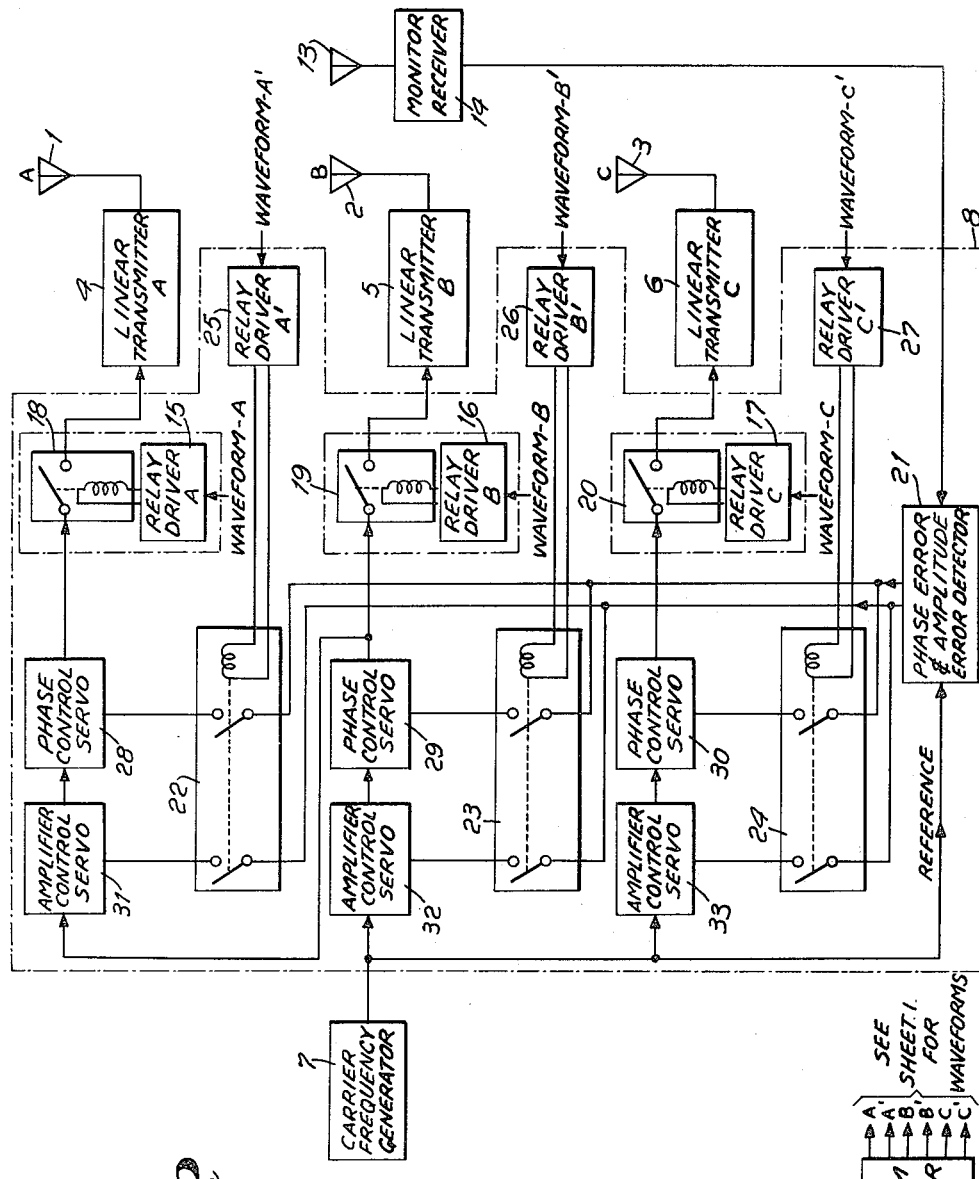

2,952,016

SAMPLING AND CORRECTING SYSTEM

Jesse S. Le Grand, Wood Ridge, and Richard H. Myers, West Caldwell, N.J., assignors to International Telephone and Telegraph Corporation, Nutley, N.J., a corporation of Maryland Filed July 12, 1957, Ser. No. 671,640

6 Claims. (Cl. 343—102)

This invention relates to a correction system for bringing three or more electrical signals into phase and amplitude agreement.

In many systems it is necessary to bring a plurality of electrical signals into phase and amplitude agreement. One example of this is the system known as "Navaglobe," referred to in the copending application of M. Dishal et al., Serial No. 499,046, filed April 4, 1955, now Patent No. 2,861,177 issued November 18, 1958, for "Control System for Correcting Phase and Amplitude." In bringing a plurality of signals into agreement, it has been the practice to successively compare each signal with a reference and bring the signals successively into agreement therewith. In certain systems, however, this one-to-one comparison of a single signal and a reference introduces difficulties or undesirable features. For example, in the Navaglobe system three radiating antennas located at the corners of an equilateral triangle and separated a distance equal to less than one-half wavelength of the frequency radiated are cyclically fed in pairs to produce three differently directed radiation patterns. In a mobile craft using this beacon as a guide, the energy received according to each of these different patterns is compared, and a line of direction is obtained therefrom. For this bearing to be accurate, it is essential that the signals radiated by the different antennas be closely controlled in amplitude and phase. Since the cyclical signals emitted by the antennas are emitted two at a time and can be detected only as the vector sum of two signals, it has been necessary to interrupt the sequence of radiation in pairs to permit making the phase and amplitude correction by successive comparison with a reference on a one-to-one basis. This interruption of the cyclical operation of the beacon is undesirable and further affects the complexity of equipment required at both the beacon and the mobile craft utilizing the beacon signals.

In the application of R. H. Myers Serial No. 670,431, filed July 8, 1957, "Phase and Amplitude Correction System and Navaglobe Beacon Utilizing Same," there is disclosed a system for bringing a plurality of signals into phase and amplitude agreement where the signals must be taken in groups, for example, as the vector sum of the signals which compose each group. In said copending application, systems are described in which all the signals but one are changed to bring them into agreement with said one signal. In adjusting the signals repeated comparisons are made between different groups of said signals and a reference signal; and in the system of said application, in one of the steps for bringing all of said signals into agreement the reference signal is also changed. However, in many cases it is desirable to vary all the signals to bring each of them to some predetermined amplitude and phase. In many instances it is also advantageous to have a fixed reference signal which is not changed during the correction process.

An object of the present invention is the provision of an improved correction system for bringing a plurality of signals into phase and amplitude agreement.

Another object of the present invention is the provision of such a correction system in which the signals are sensed in groups of two or more as the vector sum of the signals which compose each group, and in which each and every one of the signals (not including the reference signal) is changed to a predetermined amplitude and phase.

A further object of the present invention is the provision of a system for bringing signals sensed in groups into agreement in which the reference signal with which the groups are compared is unchanged during the correction process.

In accordance with a feature of the present invention, the vector sum of signals which compose each group is compared with the reference signal to produce an error signal, and this error signal is applied to correct one of the signals of the group being compared except in certain steps where the error signal is nulled by adjusting more than one of the signals in the group.

Other and further objects of the present invention will become apparent, and the foregoing will be better understood with reference to the following description of embodiments thereof, reference being had to the drawings, in which:

Fig. 1 is a schematic and block diagram of a Navaglobe beacon transmitter including the radiation patterns;

Fig. 2 is a block diagram of the system of Fig. 1 showing in greater detail the switching circuit; and Fig. 3 is a waveform diagram and a chart of the sequence of steps used in describing the operation of the system of Fig. 2.

In carrying out the present invention, the vector sums of successive different groups of the total number of signals to be brought into phase and amplitude agreement are compared with the reference signal, and in each comparison one of the signals involved is corrected, but the reference signal itself is never changed. In certain instances the correction is made on a plurality of the signals by partially correcting more than one. While the reference signal can be substantially different in phase and amplitude from each of these vector sums, for simplicity in instrumentation and to avoid large corrections the reference signal is preferably set close to the approximate phase and amplitude of the vector sums. Each of the groups preferably has the same number of signals therein, and each signal should appear in at least two groups.

In many cases the members of the group vary according to a cyclically permutative order. In such cyclical permutation schemes, it is preferred that the number of signals in the group should be relatively prime with respect to the total number of signals involved. (The total number does not include the reference signal.) That is to say, there must not be a common integral denominator other than unity for the number of signals in a group and the total number of signals involved.

Features of the invention are brought forth by its application to monitor and control radiation from the antennas A, B and C which form a Navaglobe beacon as, for example, illustrated in Fig. 1. In such application, the correction system is employed to maintain radiation from each of the three antennas, which radiate cophasally in pairs, equal to a fixed reference signal. The reference signal R is selected to have a magnitude approximately equal to 2A and is approximately in phase with signal A. While not absolutely required, this enables achieving the correction with only small adjustments of phase and amplitude instead of very large ones which would introduce problems of instrumentation. In vector notation, this requirement may be stated as $\overline{R}=2\overline{A}+\overline{\Delta}$, where $\overline{\Delta}$ represents a vectorial difference. The following groups are compared with the reference signal in the enumerated order, and the indicated corrections of phase and amplitude of vertor signals are made to bring signals A, B and C into equality, and equal to ½R̄, that is, equal in magnitude to ½R̄ and in phase therewith.

Make $B+C=R$ by adjusting C,
Make $C+A=R$ by adjusting A,
Therefore, $A=B$.
Make $A+B=R$ by adjusting A to correct ½ of the error and adjusting B to correct the other half,
Therefore, $A=B=½R$.
Make $B+C=R$ by adjusting C,
Therefore, $C=A=B=½R$.

Upon inspection of the above series of comparisons and corrections, it becomes clear that the radiation from each of the antennas, A, B and C, which is detected in pairs can be brought into equality with a fixed reference and thus, into equality with each other, in 1⅓ cycles of the rotating beacon produced by the sequential radiation in pairs. Since it is the object of the Navaglobe system to create the beacon by radiating the three antennas cophasally in pairs, we see that the above described monitoring and correction of the radiation from each of the three antennas is achieved without interfering in any way with the cyclic operation of the Navaglobe system.

Turning specifically to Fig. 1, a Navaglobe radio beacon transmitter is represented comprising antennas 1, 2 and 3, which together with their radiated signals will be referred to hereinafter as A, B and C, respectively, powered by linear transmitters 4, 5 and 6, respectively. These linear transmitters are controlled by signals from carrier frequency generator 7 through switching circuit 8 which is controlled by the signals from waveform generator 9. The signals from the waveform generator, which are shown in Fig. 3, are such that they cause the antennas to be energized in pairs in the order B and C, then C and A, then A and B, producing radiation field patterns represented by lines 10, 11 and 12, respectively. For the purpose of monitoring radiation from the antennas, a receiver antenna 13 is located equidistant from the three radiating antennas, A, B and C. Receiver antenna 13 feeds monitor receiver 14 which produces a signal that is a function of the vector sum of the radiation received from the two antennas which compose each pair. The signal from monitor receiver 14 is fed to switching circuit 8 for comparisons with a reference signal. Switching circuit 8 serves to feed phase and amplitude adjusted signals derived from carrier frequency generator 7 to control transmitters 4, 5 and 6 which power antennas A, B and C, respectively. Thus, the adjusted signals from switching circuit 8 control power to antennas A, B and C so that the radiation from each of these antennas as detected by receiver antenna 13, is brought into equality with a fixed reference signal.

Turning now to Fig. 2, there is represented a detailed schematic block diagram of the switching circuit 8 of Fig. 1 which feeds phase and amplitude adjust signals to control transmitters 4, 5 and 6 which power the radiating antennas A, B and C. There is also shown frequency generator 7, waveform generator 9, receiver antenna 13 and monitor receiver 14, all of which feed signals to switching circuit 8 as shown also in Fig. 1. In switching circuit 8, relay drivers 15, 16 and 17 are energized by pulses from waveforms A, B and C, respectively. Relay drivers 15, 16 and 17 energize relays 18, 19 and 20 which feed the carrier frequency signal to linear transmitters 4, 5 and 6, respectively. The pulses in waveforms A, B and C, shown in Fig. 3, are such that antennas A, B and C are caused to be energized sequentially in the pairs B and C, then C and A, then A and B. The pulses in these waveforms are repeated continually so that the sequential radiation in pairs is repeated continually. The radiation from each pair of antennas sensed by receiver antenna 13 is fed via monitor receiver 14 to a phase and amplitude error detector 21 which compares the received signal with a fixed reference signal derived from carrier frequency generator 7, and produces phase and amplitude difference signals. The phase and amplitude difference signals from the error detector 21 are applied to relay switches 22, 23 and 24 which are energized by relay drivers 25, 26 and 27, respectively. These relay drivers, 25, 26 and 27, receive waveforms A', B' and C', respectively, and energize relay switches 22, 23 and 24 when pulsed by their respective waveforms. The waveforms A', B' and C', shown in Fig. 3, contain pulses which are timed to cause relay switches 22, 23 and 24 to be energized and, thus, closed at appropriate times so that the phase error and amplitude error signals from error detector 21 are applied to phase control servo 28, 29 or 30 and amplitude control servo 31, 32 or 33 to bring the phase and amplitude of the signal detected at receiver antenna 13 and the fixed reference signal derived from error frequency generator 7, which are compared in error detector 21, into phase and amplitude agreement. Thus, it is seen that pulses in the waveforms from waveform generator 9 cause a series of relays to operate causing the three antennas to radiate sequentially in pairs and causing phase and amplitude error signals to adjust radiation from at least one of the antennas so that the phase and amplitude error signals are nulled.

Referring now to Fig. 3, there is shown a set of waveforms that can be used in a system such as that shown in Fig. 2, to make it operative in bringing the radiation from three antennas A, B and C as detected at a central point by monitor antenna 13 into equality when the antennas radiate in pairs. Examination of waveforms A, B and C which cause antennas A, B and C, respectively, to radiate, make it apparent that the antennas will radiate sequentially in pairs for one period of the waveforms; the sequence being B and C, then C and A, then A and B. Examination of waveforms A', B' and C' make it apparent that they will cause relays 22, 23 and 24 of Fig. 2 to be enrgized and, thus, closed applying phase and amplitude correction to the signals from carrier frequency generator 7 which controls linear transmitters 4, 5 and 6 which in turn power antennas A, B and C, respectively. It should be noted that antennas A and B are caused to radiate when relays 18 and 19, respectively, are energized and this occurs when waveforms A and B deliver pulses to relay drivers 15 and 16, respectively. The signal from carrier frequency generator 7 which controls linear transmitter 5 is controlled by phase control servo 29 and amplitude control servo 32, and these control servos also control the signal which controls linear transmitter 4. Thus, when waveforms A and B cause antennas A and B to radiate as a pair, waveform B' will cause phase control servo 29 and amplitude control servo 32 to simultaneously adjust radiation from both antennas A and B by the same amount so that the phase error signal and amplitude error signal from error detector 21 will be nulled. In other words, one half of the phase error and one half of the amplitude error will be eliminated by adjustments to radiation from antenna A and the other half of each error will be eliminated by adjustments to radiation from antenna B.

It can be readily understood that while the system described in this invention as applied to maintain phase and amplitude equality of radiation from the three antennas which form the beacon of the Navaglobe system shows a simple application of the invention, the underlying principle would be the same if the invented system were applied to beacons composed of more than three antennas radiating in groups of two or more. Furthermore, many types of equipment may be used without departure from the invention as described herein. Other means for monitoring signals, detecting phase and amplitude differences, controlling phase and amplitude of transmitted signals and means for causing radiation to sequence and phase and amplitude controls to operate could be used to achieve the same effect. The various units indicated by blocks in the diagrams have not been shown in detail since many forms of equipment to perform each of their functions are already known to those skilled in the art. For example, the phase and amplitude error detector 21, employed in conjunction with phase 28—30 and amplitude 31—33 control servos may be the same as those described in the above-mentioned patent of M. Dishal et al., for "Control System for Correcting Phase and Amplitude."

It is to be clearly understood that the application of this invention in connection with specific apparatus described above is made only by way of example and not as a limitation to the scope of the invention as set forth in the object thereof and in the accompanying claims.

We claim:

1. A system for bringing a plurality of electrical signals into phase and amplitude agreement comprising a plurality of sources of electrical signals, means for detecting the vector sums of said electrical signals from each of different groups of said sources of electrical signals with each group having at least two sources therein and with each source appearing in at least one group, a fixed reference signal generator, means coupled to said reference signal generator and said vector sum detector for comparing each of the detected vector sums with the reference signal and producing a resultant error signal, and means for applying the error signal from each comparison to at least one of said sources, excluding the reference signal generator, whose signals enter into that comparison to bring each of said vector sums into agreement with said fixed reference signal.

2. A system for bringing a plurality of electrical signals into phase and amplitude agreement comprising a plurality of sources of electrical signals, means for detecting the vector sums of said electrical signals from each of a plurality of pairs of said sources of electrical signals, a fixed reference signal generator, means coupled to said reference signal generator and said vector sum detector for comparing each of the detected vector sums with the reference signal and producing a resultant error signal, and means for appling the error signal in each comparison to at least one of the sources, excluding the reference signal generator, whose signals enter into that comparison to bring each of said vector sums into agreement with said fixed reference signal, said applying means including means for switching the error signals to a plurality of said sources in at least one of the successive comparisons until all are brought into agreement.

3. A system for bringing N electrical signals into phase and amplitude agreement comprising a plurality of sources of electrical signals, means for detecting the vector sums of each of $n$ signals in a group, where N and $n$ are relatively prime, each group containing the same number of signals and the signals in successive groups varying in cyclically permutative order, a fixed reference signal generator, means coupled to said reference signal generator and said vector sum detector for comparing each of the detected vector sums with the reference signal and producing a resultant error signal, and means for applying the error signal from each comparison to at least one of the sources, excluding the reference signal generator whose signals enter into that comparison to bring each of said vector sums into agreement with said fixed reference signal, said applying means including means for switching the error signals to control a plurality of said sources in at least one of said successive comparisons until all are brought into agreement.

4. A system for bringing the signals radiated from each of a plurality of antennas into equality at a given point comprising a plurality of antennas, a plurality of signal sources, means coupled to said sources for energizing said antennas cyclically in groups, each group comprising a number of antennas less than the total number and relatively prime with respect to said total, means at the given point for detecting the combined signals from each of said groups of energized antennas, a fixed reference signal generator, means coupled to said reference signal generator and said detecting means for comparing the signals detected from each group of antennas with the reference signal and producing a resultant error signal, and means for applying the error signal from each comparison to said signal sources, excluding said reference signal generator, to bring the detected radiation into agreement with said reference signal.

5. A system for bringing the signals radiated from each of a plurality of antennas into equality at a given point comprising a plurality of antennas, a plurality of signal sources, a fixed reference signal generator, means coupled to all of said signal sources for energizing said antennas cyclically in groups, each group comprising a number of antennas less than the total number of antennas and relatively prime with respect to said total, means for detecting the signals from each of said groups of energized antennas at the given point, means coupled to said reference signal generator and said detecting means for comparing the signals detected from each group of antennas with the reference signal and producing a resultant error signal, and means for applying the error signal from each comparison to said signal sources, excluding said reference signal generator to bring the detected radiation into agreement with said fixed reference signal, said applying means including means for switching the error signal to different signal sources to vary the relative phase and amplitude between the detected signal and the reference signal until the radiation from each of the antennas to the given point are brought into agreement.

6. A Navaglobe beacon comprising three antennas located at the corners of an equilateral triangle, means including a signal energy source for energizing said antennas in cycles in groups of two so as to effectively produce a directional radiation pattern having stepped rotation, means including a monitoring antenna located at a point equidistant from each of the first-mentioned plurality of antennas for detecting the signals from each of said pairs of energized antennas at said point, a fixed reference signal generator, means coupled to said reference signal generator and said detecting means for comparing the signals detected from each pair of antennas with the reference signal and responsive to said comparisons to correct the signals emitted by each of said antennas, without changing the output of said reference signal generator, to bring them into phase and amplitude equality at said point.

References Cited in the file of this patent

UNITED STATES PATENTS

| | | |
|---|---|---|
| 2,085,424 | Goddard | June 29, 1937 |
| 2,449,174 | O'Brien | Sept. 14, 1948 |
| 2,505,670 | Gross et al. | Apr. 25, 1950 |
| 2,577,668 | Wilmotte et al. | Dec. 4, 1951 |
| 2,578,980 | O'Brien | Dec. 18, 1951 |
| 2,651,032 | Torcheux et al. | Sept. 1, 1953 |